PRF SWITCHING AND TRANSIENT BLANK TIMER

Filed Sept. 5, 1968

INVENTORS
CHARLES D. CALHOON
OSCAR M. CROMER
Harry A. Herbert Jr and
Julian L. Siegel
ATTORNEYS CHARLES D. CALHOON
OSCAR M. CROMER
Harry A. Herbert Jr. and
Julian L. Siegel
ATTORNEYS

United States Patent Office 3,452,352

Patented June 24, 1969

3,452,352

PRF SWITCHING AND TRANSIENT BLANK TIMER

Charles D. Calhoon, Catonsville, and Oscar M. Cromer, Baltimore, Md., assignors, by mesne assignments, to the United States of America as represented by the Secretary of the Air Force Filed Sept. 5, 1968, Ser. No. 757,629
Int. Cl. G01s 7/28
U.S. Cl. 343—17.1 3 Claims

ABSTRACT OF THE DISCLOSURE

A timing circuit having first and second gates for passing pulses of a first pulse train, the first gate being enabled by a first flip flop that is triggered by the output of the second gate which is in turn enabled by a pair of monostable multivibrators. A third gate passes pulses of a second pulse train enabled by a second flip flop that is triggered by the second pulse train and slaved to the first flip flop. Fourth and fifth gates pass pulses from the output of the first gate and are enabled by complementary outputs of a third flip flop which is triggered by the output of the first gate. The output of the third gate is fed to a pair of NAND gates enabled by the complementary outputs of the third flip flop and triggers the pair of monostable multi-vibrators.

*Background of the invention*

This invention relates to the generation of logic signals, and more particularly to switching and transient blank timing signals for pulse Doppler radar.

High PRF pulse Doppler radars may have pulse repetition frequencies ranging from 50 to 300 kHz., transmitter duty cycles ranging from 2 percent to 10 percent, and PRF switching rates of 50 to 200 Hz. It is common practice to generate very stable control and timing signals at the PRF by counting down from a higher frequency generated by a stable oscillator. Since the PRF must be chosen so as not to create interference frequencies in the receiver, any higher order harmonics involved in the counting down process will likewise not create interferences.

However, counting down further from the PRF to the PRF switching frequencies generates many subharmonics of the PRF which may generate interference in the receiver. Hence, it has been the practice to generate the PRF switching frequencies by the use of a chain of monostable multivibrators. Any instability of these monostable multivibrators will cause variations in integration periods and may thereby affect detection probalities.

*Summary of the invention*

The subject of this disclosure combines the interference freedom of monostable multivibrators with the stability of the PRF in generating the PRF switching frequencies. Each switch of the PRF is followed by a transient blanking period which in turn is followed by an integration and data gathering period, and another switch of the PRF.

It is an object of the invention to provide a novel logic circuit.

It is another object to provide a system for generating transient blank timing signals for a pulse Doppler radar.

It is still another object to provide a stable switching circuit for producing timing signals and avoiding interference frequencies.

These and other advantages, features and objects of the invention will become more apparent from the following description taken in connection with the illustrative embodiment in the accompanying drawings, wherein:

*Description of the preferred embodiment*

Figure 1:
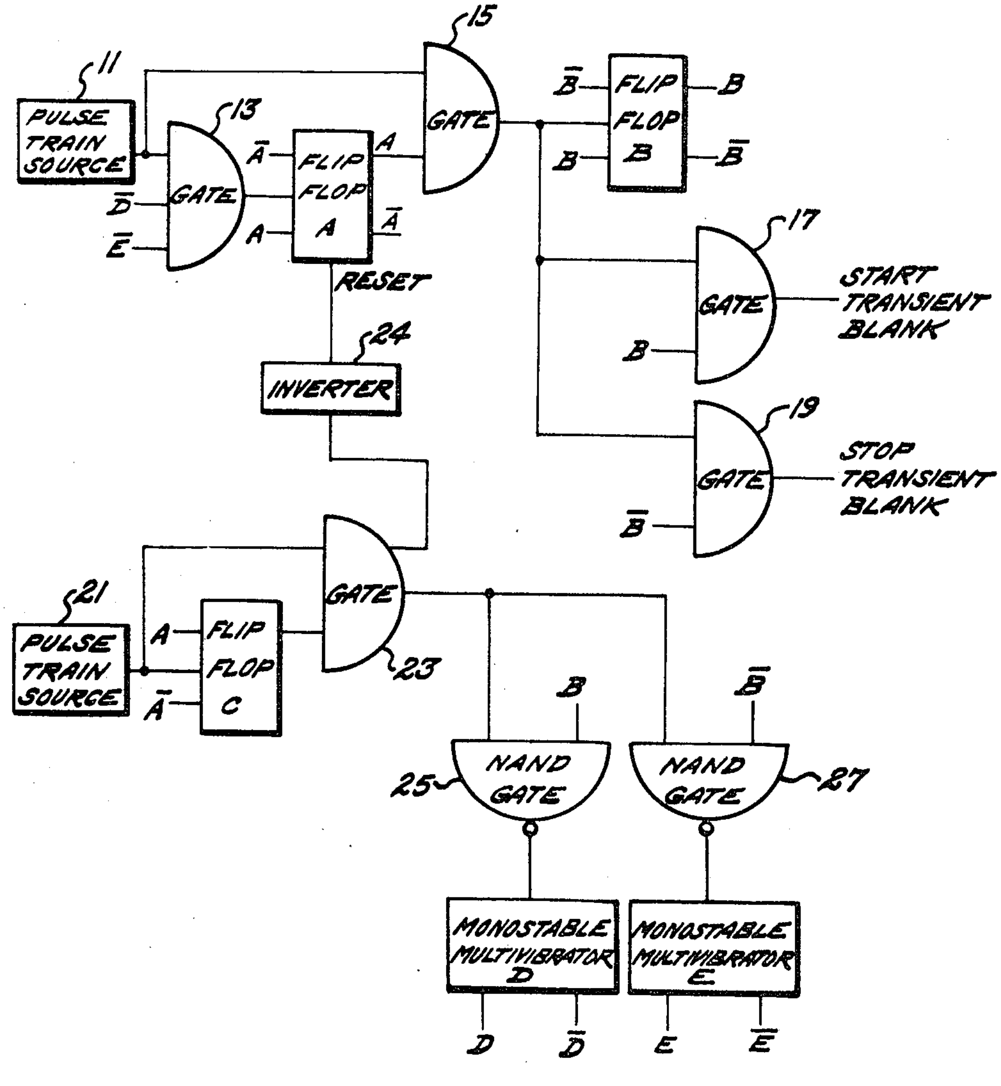
FIGURE 1 is a block diagram of an embodiment of the invention showing the logic.

Referring to the logic diagram of FIGURE 1, two pulse train sources 11 and 21 at the system PRF are provided. Since several such pulse trains are normally generated for the system's operation, no extra logic is required.

Monostable multivibrator D has an ON output terminal denoted as D and an OFF output terminal denoted as $\overline{D}$ and monostable multivibrator E has an ON output terminal denoted as E and has an OFF output terminal denoted as $\overline{E}$. The output from the OFF terminals of both monostable multivibrators D and E ($\overline{D}$ and $\overline{E}$) together with the output of pulse train source 11 are fed to AND gate 13 whose output triggers or complements flip flop A. The output from the ON terminal of flip flop A together with the output of pulse train source 11 are fed to AND gate 15 whose output triggers flip flop B that has an ON output terminal and an OFF output denoted as B and $\overline{B}$. The output from the B terminal together with pulses from AND gate 15 are fed to AND gate 17 while the output from the $\overline{B}$ terminal together with pulses from AND gate 15 are fed to AND gate 19. The A and $\overline{A}$ outputs of flip flop A are fed respectively to the Set and Reset terminals of flip flop C which is triggered by pulse train source 21. AND gate 23, fed by flip flop C and pulse train source 21, has one output that is inverted by inverter 24 and used to reset flip flop A and a second output that is fed to NAND gates 25 and 27 which are respectively enabled by the B and $\overline{B}$ outputs of flip flop B.

The particular mechanization of this invention uses readily available components, such as the Motorola MC 350 family of integrated circuits.

The operation of the invention is now explained using negative logic, i.e. pulses are negative going and the ON output voltages of the flip flop are negative with respect to the OFF outputs. Also, the monostable multivibrators are triggered using the leading edge of the pulse while the flip flops are triggered using the trailing edge.

Figure 2:
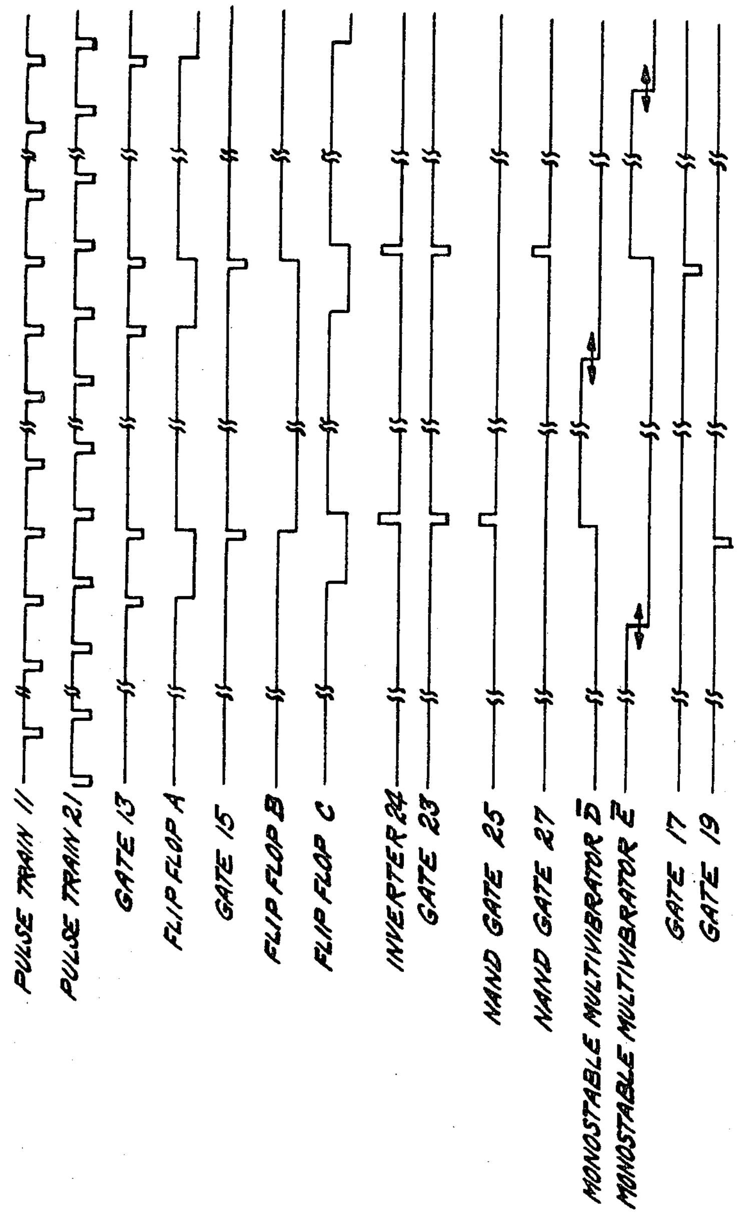
FIGURE 2 is a waveform timing diagram useful in explaining the invention.

Referring to FIGURE 2 which shows the timing diagram, monostable multivibrator D is in a stable state and monostable vibrator E is in an unstable state. As E returns to its stable state, gate 13 is enabled. The next succeeding pulse from pulse train source 11 is passed by AND gate 13 and triggers flip flops A and B, thus enabling AND gate 15. The second succeeding pulse from pulse train source 11 triggers flip flop A and flip flop B, thus inhibiting AND gate 15. Flip flop C is slaved to flip flop A, hence flip flop C is triggered by successive pulses from pulse train source 21. AND gate 23 is enabled to pass the second of the pulses that triggered flip flop C. This pulse is passed by NAND gate 25 which is now enabled by flip flop B and triggers monostable multivibrator D which in turn inhibits AND gate 13. Nothing further happens until monostable multivibrator D returns to its stable state, thus once again enabling AND gate 13 and permitting another cycle to start. The output of AND gate 23 is inverted by inverter 24 and used to insure that flip flop A locks in properly upon turn-on.

AND gate 17 and AND gate 19 are enabled alternately by flip flop B to select the output of AND gate 15 as START TRANSIENT BLANK and STOP TRANSIENT BLANK signals respectively. Duration of the unstable states of monostable multivibrators D and E can be adjusted independently to determine the ratio of transient blank time to the cycle period as shown by the double arrows in FIGURE 2. If the recovery times of these monostable multivibrators are adjusted initially to fall midway between two pulses from pulse train source 11, then they can vary with temperature over one-half a period of the pulse train without affecting the length of the period of transient blank.

The invention thus produces transient blank cycles at a stable low frequency as compared to the system PRF and avoids generation interfering frequencies.

Although the invention has been described with reference to a particular embodiment, it will be understood to those skilled in the art that the invention is capable of a variety of alternative embodiments within the spirit and scope of the appended claims.

We claim:

1. In a radar, a system for generating transient start and stop pulses comprising:

(a) a first monostable multivibrator having an ON output terminal and an OFF output terminal;

(b) a second monostable multivibrator having an ON output terminal and an OFF output terminal;

(c) a first pulse train source;

(d) a first AND gate fed by the first pulse train source and the outputs from the OFF terminals of the first and second monostable multivibrators;

(e) a first flip flop triggered by the first AND gate;

(f) a second AND gate fed by the first pulse train source and the output of the first flip flop;

(g) a second flip flop triggered by the second AND gate and having an ON output terminal and an OFF output terminal;

(h) a second pulse train source;

(i) a third flip flop triggered by the second pulse train source;

(j) a third AND gate fed by the second pulse train source and the third flip flop;

(k) a first NAND gate fed by the output of the third AND gate and the output from the ON terminal of the second flip flop, the output of the first NAND gate triggering the first monostable multivibrator;

(l) a second NAND gate fed by the third AND gate and the output for the OFF terminal of the second flip flop, the output of the second NAND gate triggering the second monostable multivibrator;

(m) a fourth AND gate fed by the second AND gate and the output from the ON terminal of the second flip flop, the output of the fourth AND gate being the start pulse; and (n) a fifth AND gate fed by the second AND gate and the output from the OFF terminal of the second flip flop, the output of the fifth AND gate being the stop pulse.

2. A system for generating transient start and stop pulses according to claim 1 which further comprises an inverter interposed between the third AND gate and the reset terminal of the first flip flop.

3. A system for generating transient start and stop pulses according to claim 2 wherein the first and second monostable multivibrators are adjustable for controlling the duration of the unstable states.

References Cited

UNITED STATES PATENTS

| | | | |
|---|---|---|---|
| 3,044,065 | 7/1962 | Barney et al. | 328—41 X |
| 3,150,370 | 9/1964 | Lisicky | 343—17.1 |
| 3,263,226 | 7/1966 | Munich | 343—17.1 |

RODNEY P. BENNETT, *Primary Examiner.*

CHARLES L. WHITMAN, *Assistant Examiner.*

U.S. Cl. X.R.

328—41